United States Patent [19]

Rabinovitch et al.

[11] 4,320,174
[45] Mar. 16, 1982

[54] TRANSPARENT AND TRANSLUCENT VINYL POLYMERIC COMPOSITE

[75] Inventors: Elvira B. Rabinovitch, South Euclid; James W. Summers, Bay Village, both of Ohio

[73] Assignee: The B. F. Goodrich Company, Akron, Ohio

[21] Appl. No.: 187,379

[22] Filed: Sep. 15, 1980

[51] Int. Cl.$^3$ .......................... B32B 27/08; B44D 1/44
[52] U.S. Cl. .................................... 428/518; 428/520; 428/913; 428/403
[58] Field of Search ................. 428/518, 913, 520–522

[56] References Cited

U.S. PATENT DOCUMENTS

| | | | |
|---|---|---|---|
| 3,194,725 | 7/1965 | Pounds | 428/520 X |
| 3,429,732 | 2/1969 | Baitinger | 428/913 |
| 4,100,325 | 7/1978 | Summers et al. | 428/518 X |
| 4,156,749 | 5/1979 | Lustig et al. | 428/518 X |

Primary Examiner—P. Ives
Attorney, Agent, or Firm—Roy P. Wymbs

[57] ABSTRACT

The invention relates to obtaining weather-ability or U.V. light stability in vinyl polymeric translucent and transparent materials, which are designed for use in corrugated roofing, films for greenhouses, and the like. It has been found that by making a composite vinyl polymeric material where the main material or substrate is a transparent or translucent vinyl polymer and capping or coating it with a very thin film of a plasticized vinyl polymer containing a high level of a clear U.V. light absorber or stabilizer, such as, for example 1-cyano-2,2-diphenyl ethylacrylate, excellent weatherability is obtained. The important feature is the concentration of the clear U.V. stabilizer at the surface of the composite material which also results in the use of less U.V. stabilizer.

14 Claims, No Drawings

TRANSPARENT AND TRANSLUCENT VINYL POLYMERIC COMPOSITE

BACKGROUND OF THE INVENTION

Polymeric materials, such as vinyl polymers, and products made therefrom must exhibit resistance to degradation if they are to have any useful commercial value. The degradation can be a partial or total loss of structural integrity, a darkening or discoloration of the product, a loss of flexibility or resilience, or a combination of any of these phenomena. The various types of degradation, above referred to, are promoted or catalyzed by oxygen (air), heat, and light, and in particular, ultraviolet (UV) light.

In order to protect polymeric materials, it has been the practice in the art to add various ingredients or stabilizers to the polymers, or compounds thereof, to prevent or inhibit degradation of finished articles made therefrom. In this regard, see U.S. Pat. No. 4,069,195 and the numerous prior art references cited in the specification which relate to the stabilization of polymeric materials against degradation. These stabilizers work in diverse and complex ways, such that a compound that stabilizes against heat and oxygen degradation in a polymer or resin may not stabilize against light degradation in the same polymer or resin or vice versa. Further, a compound that acts as a stabilizer against oxygen degradation in one type of polymeric material may be relatively inactive in another type of polymeric material. Accordingly, compounds that are stabilizers are further classified as antioxidants, antiozonants, heat stabilizers, and ultraviolet (UV) light stabilizers, depending upon what type of stabilization they demonstrate. In many instances, to obtain optimum protection, a mixture of compounds, each specifically selected to afford maximum protection against a certain type of degradation, is often used. In U.S. Pat. No. 4,100,325 improved weather resistant polymers have improved impact resistance by employing a minimum amount of $TiO_2$ in the capstock formulation. However, such products are opaque.

One of the more difficult to control of the degradative forces is irradiation of the polymer by UV light. The impact of such irradiation will vary depending upon the intensity and duration of exposure and therefore, may manifest itself only after a prolonged period of time. The irradiation of polymers with UV light can often cause cross-linking of the polymeric materials thereby reducing their resiliency and/or impact resistance. Changes in color and opacity are also often effected by prolonged exposure of the polymeric material to UV light. While many materials are known, and commercially available, as stabilizers against UV light degradation, the degree of protection afforded by such agents is often dependent upon the concentration thereof in the polymeric compound. This presents economic difficulties and affects commercialization since the cost of said stabilizers or agents is very expensive, particularly by comparison to the cost of the polymeric materials they are employed with to reduce UV Light degradation.

Vinyl polymers, and particularly polyvinyl chloride (PVC), compounds without ultraviolet light protection are not stable to the weather. For example, they become tan, brown or black in a hot climate, such as the climate in Arizona, or they rapidly fade or become white in a cold climate, such as the climate in northern Ohio. Known PVC formulations, which are good performers in the weather, contain large amounts of titanium dioxide pigment. This pigment acts as an UV light absorber, thus protecting the PVC against degradation. However, it also makes the polymeric material opaque. In order to get weatherability, or UV light stabilization, in translucent polymeric materials, such as are used in corrugated roofing for patios, and the like, or in transparent polymeric materials, a clear UV light absorber or stabilizer must be used. Thus it can be seen that there is a need to find a clear UV stabilizer for vinyl polymeric materials but also an economic and commercial method of using the same to protect said materials from UV light degradation.

SUMMARY OF THE INVENTION

This invention is concerned with obtaining weatherability or UV light stability in vinyl polymeric translucent and transparent materials, such as in corrugated roofing, films, and the like. We have found that by making a composite vinyl polymeric material where the main material is a transparent or translucent vinyl polymer and capping or coating it with a very thin film of a plasticized vinyl polymer containing a high level of a clear UV light absorber or stabilizer, such as, for example, 1-cyano-2,2-diphenyl ethylacrylate, excellent weatherability is obtained. The important feature of the invention is the concentration of the clear UV light stabilizer at the surface of the vinyl polymeric material.

DETAILED DESCRIPTION

The composite polymeric materials of the present invention, which are suitable for use when subjected to UV light, are those which comprise a main vinyl polymer material, or substrate, which is transparent or translucent and having over the surface thereof, and integrally attached thereto, a film or capstock of a vinyl polymer containing an UV light stabilizer of such a nature that the composite material is transparent or translucent. The film or capstock should also contain a plasticizer for the vinyl polymer. Accordingly, the vinyl polymer particles should be porous to allow for good penetration of the plasticizer therethrough.

Vinyl polymer material, as used herein, refers to homopolymers and copolymers of vinyl halides and vinylidene halides, such as vinyl chloride, vinyl bromide, vinylidene chloride, etc. The vinyl halides and vinylidene halides may be copolymerized with each other or each with one or more polymerizable olefinic monomers having at least one terminal $CH_2=C<$ grouping. As examples of such olefinic monomers there may be mentioned the $\alpha, \beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide and the like; vinyl ester, such as ethyl vinyl ether, chloroethyl vinyl ether, and the like; the vinyl ketones; styrene and styrene derivatives, such as $\alpha$-methyl styrene, vinyl toluene, chlorostyrene, and the like; vinyl naphthalene, allyl and vinyl chloroacetate, vinyl acetate, vinyl pyridene, methyl vinyl ketone; the diolefins including butadiene, isoprene, chloroprene, and the like; and other polymerizable olefinic monomers of the types known to those skilled in the art. The important aspect of the vinyl polymer material is that it must be of such a nature as to produce transparent or translucent finished articles.

The present invention is particularly applicable to homopolymers and copolymers made by the polymerization of vinyl chloride or vinylidene chloride alone or in admixture with one or more polymerizable olefinic monomers copolymerizable therewith in amounts up to about 40% by weight, based on the weight of the monomer mixture. The most preferred vinyl polymer, or resin, is polyvinyl chloride (PVC) and the invention, for simplicity and convenience, will be described in connection therewith, it being understood that this is merely intended in an illustrative sense and not limitative.

In making the capstock, or in some cases, the film, or laminated film, for use with the substrate, the proper vinyl chloride polymer should be employed, and preferably, PVC (polyvinyl chloride). The polymer particles must have good porosity in order to efficiently absorb the plasticizer and U.V. light stabilizer. Solid, nonporous polymers must be more highly swollen and require too high a concentration of plasticizer to produce acceptable products. It has been found that vinyl chloride polymer particles containing from about 10% to about 80% by volume of pore space are satisfactory in making the capstock or film for use in the composites of the present invention. Preferably, the polymer particles contain from about 25% to about 45% by volume of pore space.

The next necessary ingredient of the capstock is a suitable plasticizer. The amount of plasticizer employed is in the range of about 10 parts to less than about 35 parts by weight based on the weight of 100 parts of vinyl polymer. It is preferred, however, to employ the plasticizer in a range of about 15 parts to about 25 parts by weight, based on the weight of 100 parts of polymer. This amount of plasticizer is well below the amounts usually employed in making plasticized vinyl polymers and particularly, in making PVC plastisols. In fact, in the present invention, when amounts of plasticizer greater than 35 parts by weight per 100 parts by weight of vinyl chloride polymer are used, the plasticizer have a tendency to migrate into the substrate with the adverse result of lowering the impact retention upon weathering of the composite.

Among the suitable plasticizers for use in the capstock or film there may be mentioned, by way of example, the phthalic acid and isophthalic acid diesters of benzyl or phenyl radicals, or alkyl, alkoxyalkyl or cycloalkyl radicals containing from 1 to 24 carbon atoms, and preferably 4 to 16 carbon atoms, such as, diisooctyl isophthalate, butyl benzyl phthalate, diphenyl phthalate, dimethyl phthalate, diisobutyl phthalate, diisoamyl phthalate, diisohexyl phthalate, di-n-hexyl phthalate, di-(2-ethyl hexyl) phthalate, diisooctyl phthalate, di-n-octyl phthalate, diisocicyl phthalate, di-n-dicyl phthalate, butyl nonyl phthalate, butyl dicyl phthalate, isooctyl isodicyl phthalate, n-octyl n-dicyl phthalate, di (butyoxyethyl) phthalate, dicyclohexyl phthalate, and the like. In addition, there are other plasticizers useful in the present invention, such as, by way of example, diisobutyl adipate, diisooctyl adipate di-(2 ethyl hexyl) adipate, diisodicyl adipate, isoodyl isodicyl adipate, epoxidized soybean oil, di-(2-ethyl hexyl) agelate, diisooctyl agelate, dibenzyl sibacate, dimethyl sebacate, dibutyl sebacate, di-(2-ethyl hexyl) sebacate, diisoctyl sebacate, and the like. Also suitable as plasticizers are the ricinoleates, such as, for example, diethylene glycol monoricinoleate, methyl reinoleate, and the like. Further, triorganophosphates may also be used, such as, triphenyl phosphate, cresyl diphenyl phosphate, tributyl phosphate, and the like. However, the preferred plasticizer for use in the present invention are the liquid phthalate plasticizers, among which, particularly good results are obtained when using di-(2-ethyl hexyl) phthalate or diisodicyl phthalate. It should also be pointed out that a mixture of the plasticizers may also be employed, that is, two or more of the above type plasticizers, depending upon the particular polymer being used and the porosity thereof.

The most important ingredient in the capstock or film of the composite is the U.V. light stabilizer and the amount thereof. As previously pointed out, the U.V. stabilizer must be a clear compound and be compatible with the vinyl chloride polymer and plasticizer so as not to adversely affect the transparency or translucency of the finished composite material. Among the clear compounds suitable as U.V. light stabilizers in the present invention are various substituted alkyl acrylates and alkoxy benzophenones. As examples of such compounds there may be named 1-cyano-2,2-diphenyl ethylacrylate, 1-cyano-2,2-diphenyl octylacrylate, 2-hydroxy-4-octoxybenzophenone, 2,4-di-t-butylphenyl 1-3,5-di-t-butyl-4-hydroxybenzoate, N-(p-ethoxycarbonylphenyl)-N'-methyl-N'-phenylformanidine, and the like. The amount of U.V. light stabilizer in the capstock or film satisfactory to obtain the desired results will vary with the type vinyl polymer used therein. Usually, the amount will be in the range of about 1 part to about 15 parts by weight, based on the weight of 100 parts of vinyl polymer in the capstock or film. It is preferred, however, to employ an amount of stabilizer in the range of about 4 parts to about 8 parts by weight, based upon the weight of 100 parts of vinyl polymer.

The thickness of the capstock or film that is put over the substrate will vary, of course, depending upon the end use of the composite material. Normally, the thickness of the capstock, for all end uses will be in the range of about 0.001 inch to about 0.01 inch in thickness. It is preferred, however, for practical and economic purposes, to employ a capstock or film having a thickness in the range of about 0.002 inch to about 0.004 inch. The important thing, as previously pointed out, is to concentrate the U.V. light stabilizer at the surface of the composite material, or in other words, in the capstock or film.

In addition to the materials named above, the vinyl chloride polymer capstocks or films of this invention may contain other ingredients, such as, for example, fillers, stabilizers other than U.V. light stabilizers, lubricants, processing aids, colorants, and the like. It should be borne in mind, however, that any additional ingredient chosen, for whatever purpose, should be one that will not appreciably affect the transparency or translucency properties of the finished composite article.

The substrates suitable for use in the present invention include vinyl chloride polymers, such as PVC and those clear polymers defined above in connection with the capstock, and chlorinated vinyl chloride homopolymers and copolymers. When the composite material is designed for use in making corrugated roofing material, then the substrate should contain a rigid polymeric material, such as rigid PVC, for example. One can also employ in the substrate blends of homopolymers, and blends of homopolymers and/or copolymers of the vinyl chloride polymers and CPVC. The vinyl chloride polymers may contain from 0 up to about 40% by weight and preferably, less than about 20% by weight of one or more polymerizable olefinic monomers having at least one terminal $CH_2=C<$ grouping. More preferably, not more than about 10% by weight of such olefinic monomers is employed. The vinyl chloride polymers for use in the substrate will have an inherent viscosity (IV) of from about 0.45 to about 1.2 and preferably, from about 0.85 to about 1.2, as measured using 0.2 gram of polymer or resin in 100 ml. of cyclohexanone at 30° C. by ASTM D 1243. This range of IV is likewise applicable to the IV of the polymers used in the capstock. The vinyl chloride polymeric substrates, as well as those containing chlorinated vinyl chloride polymers, may contain other ingredients, such as fillers, stabilizers, processing aids, colorants, and the like. However, preferably the substrate polymeric material should be substantially free of liquid plasticizers.

The substrate, or main portion, of the composite material should have a thickness in the range of about 0.01 inch to about 0.20 inch and preferably a thickness in the range of about 0.04 inch to about 0.10 inch.

When employing the chlorinated vinyl chloride polymers (CPVC) as the substrate in this invention, the vinyl chloride materials described hereinabove may be chlorinated by the method shown in U.S. Pat. No. 2,996,489. The chlorinated vinyl chloride polymers for use herein should have a chlorine content in the range of from about 60% to about 69% by weight and preferably, from about 65% to about 67% by weight.

When forming the composite material of the present invention, the vinyl chloride capstock or film is placed on the desired substrate by coextrusion or lamination thus forming a composite having greatly improved appearance and improved weatherability due to its resistance to U.V. light degradation by reason of the U.V. light stabilizer being concentrated at the surface thereof. Coextrusion is a process whereby two or more polymeric materials are simultaneously brought into contact with one another in juxtaposed relationship at a point prior to the extrusion thereof through a shape-forming extrusion die. The preferred method of coextrusion is the common manifold method described in U.S. Pat. No. 3,476,627. Lamination, on the other hand, is a process whereby two or more products are shaped separately and then later applied together. The preferred method of lamination is to extrude the substrate and thereafter laminate the capstock onto the substrate by pressing the capstock and substrate together between two rolls, or a plurality of rolls arranged in pairs, while the substrate is still hot. It is understood, of course, that the capstock can be in the form of a thin flexible film during lamination.

To further illustrate the present invention, the following specific examples are given, it being understood that this is merely intended in an illustrative and not a limitative sense. In the examples, all parts and percents are by weight unless otherwise indicated.

EXAMPLE I

In this example a transparent PVC substrate was made as well as combining said substrate with various capstocks, which were likewise transparent. The capstocks contained different U.V. stabilizers. The yellowness index was determined for each clear sample in accordance with ASTM D 1925-70. Changes in yellowness were expressed as $\Delta Y.I.$ Color change was determined for each of the translucent samples as calculated by the FMC-2 method, as described by G. Wyzecki in "Journal of the Optical Society of America", 58. 290 (1968). The FMC-2 color change is expressed as $\Delta E$. The compound formulation for making the transparent PVC substrate was as follows:

TABLE I

| Ingredient | Parts |
|---|---|
| PVC - Low Mol. Wt.[1] | 100 |
| Acrylic Processing Aid | 1.5 |
| Impact modifier | 11.0 |
| Dibutyl-tin stabilizer | 2.75 |
| Pigment (blue toner) 0.35 | |
| Lubricants | 1.50 |

[1]Inherent Viscosity 0.68

A series of 4 transparent capstock compounds were made in accordance with the following formulations in each of which a different U.V. stabilizer was employed.

TABLE II

| Ingredient in Parts | Capstock No. | | | |
| | 1 | 2 | 3 | 4 |
|---|---|---|---|---|
| PVC - High Mol. Wt.[1] | 100 | 100 | 100 | 100 |
| Dioctyl phthalate | 20 | 20 | — | 15 |
| Epoxidized soybean oil | 5 | 5 | 5 | 5 |
| Santicizer XW877[2] | — | — | 20 | — |
| Barium-cadmium stabilizer | 3.5 | 3.5 | 3.5 | 3.5 |
| Lubricant | .5 | .5 | .5 | 2.0 |
| U.V. Stabilizer[3] | 5 | 5 | 10 | 5 |
| Pigment (blue toner) | .175 | .175 | .175 | .175 |

[1]Inherent viscosity 1.00
[2]Plasticizer made by Monsanto Co.
[3]1-cyano-2,2-diphenyl ethyl acrylate in No. 1.
1-cyano-2,2-diphenyl octyl acrylate in No. 2.
2-hydroxy-4-methoxy benzophenone in No. 3.
2-hydroxy-4n-octoxybenzophenone in No. 4.

The substrate compound of rigid PVC of Table I was extruded in a flat piece about 6 inches wide and 0.04 inch thick. Thereafter, the capstock compounds of Table II were extruded into very thin films having a thickness of 0.003 inch and each film was laminated to a piece of the extruded substrate. Thereafter, the composite materials, along with a piece of the substrate alone, were placed in a photooxidation chamber and subjected to 400 hours of accelerated exposure to a mercury vapor U.V. light source at a temperature of 120° F. After such exposure, the color change ($\Delta Y.I.$) was determined for each sample with the following results:

TABLE III

| Material | Color Change, $\Delta Y.I.$ |
|---|---|
| Transparent PVC Substrate | 47.0 |
| Substrate + Capstock No. 1 | 3.4 |
| Substrate + Capstock No. 2 | 4.0 |
| Substrate + Capstock No. 3 | 3.7 |
| Substrate + Capstock No. 4 | 5.8 |

The results clearly show the excellent results obtained, with respect to weatherability, when a film of plasticized PVC containing high levels of a clear U.V. light absorber is combined with a substrate of unplasticized PVC which is transparent.

EXAMPLE II

In this example a green translucent PVC substrate was made. Then the substrate was combined with each of the 4 capstocks listed in Table II of Example I. The same procedure was followed as in Example I in preparing the composite materials. The compound formulation used in making the translucent PVC substrate was as follows:

TABLE IV

| Ingredient | Parts |
|---|---|
| PVC - High Mol. Wt.[1] | 100 |
| Acrylic processing aid | 3 |
| Acrylic impact modifier | 6 |
| Dimethyl tin stabilizer | 2 |
| Lubricants | 4 |
| TiO$_2$ | 0.017 |
| Fastolux green 264-0414 (phthalocyanine) | 0.005 |

[1]Inherent viscosity 0.92

Each of the composite materials, along with a piece of the substrate alone, were placed in a photo-oxidation chamber and subjected to 400 hours of accelerated exposure to a mercury vapor U.V. light source at a temperature of 120° F. After such exposure, the color change (ΔE) was determined for each sample with the following results:

TABLE V

| Material | Color Change ΔE (FMC-2) |
|---|---|
| Translucent PVC Substrate | 43.0 |
| Substrate + Capstock No. 1 | 2.2 |
| Substrate + Capstock No. 2 | 5.1 |
| Substrate + Capstock No. 3 | 4.7 |
| Substrate + Capstock No. 4 | 8.3 |

Again, superior results were obtained when a clear film of plasticized PVC containing high levels of a clear U.V. light absorber was combined with a substrate of unplasticized PVC which was translucent. These translucent composites are excellent for use in making corrugated roofing materials for porches, patios, and the like.

EXAMPLE III

In this example, transparent and translucent substrates and composites were made and tested outdoors in Arizona, Ohio and Florida. Six-inch square panels were made of each of the materials and placed at a 45° angle, facing south, in each of the States named. At 0, 3, 6 and 12 months the yellowness index, or color change, was determined for each panel, as described in the previous examples. The formulations for the substrates were as follows:

TABLE VI

| Ingredient (In Parts) | A Transparent Substrate | B Translucent Substrate |
|---|---|---|
| PVC - Low Mol. Wt.[1] | 100 | — |
| PVC - High Mol. Wt.[2] | — | 100 |
| Acrylic processing aid | 1.5 | 3 |
| Acrylic impact modifier | — | 6 |
| Dibutyl tin stabilizer | 2.75 | — |
| Dimethyl tin stabilizer | — | 2 |
| Pigment (blue toner) | 0.35 | — |
| Pigment (yellow-green) | — | 0.1 |
| Lubricant | 1.0 | 4 |

[1]Inherent viscosity 0.68
[2]Inherent viscosity 0.92

A clear or transparent capstock C was laminated to substrates A and B and was made from the following formulation:

| | Parts |
|---|---|
| PVC - High mol. wt. (I.V. 1.0) | 100 |
| Dioctyl phthalate | 15 |
| Epoxidized soybean oil | 5 |
| Barium-cadmium stabilizer | 3.5 |
| Lubricant | 0.5 |
| Pigment (blue toner) | 0.175 |
| U.V. stabilizer - 1-cyano-2,2-diphenyl ethyl acrylate | 5 |

The outdoor weathering data is tabulated in the following table:

TABLE VII

| State | Time Of Exposure Months | Yellowness Index | | Change in (ΔE) Color | |
|---|---|---|---|---|---|
| | | Substrate A | C over A | Substrate B | C over B |
| | 0 | −2.34 | −1.95 | — | — |
| Arizona | 3 | 62.1 | 2.9 | 38.4 | 4.1 |
| | 6 | 79.7 | 11.2 | 42.1 | 3.0 |
| | 12 | 94.7 | 13.8 | 64.5 | 20.9 |
| Ohio | 3 | 35.7 | 0.7 | 22.7 | 3.5 |
| | 6 | 42.8 | 4.3 | — | 7.7 |
| | 12 | 60.7 | 16.3 | 46.7 | 16.8 |
| Florida | 3 | 32.1 | 3.1 | 21.9 | 8.6 |
| | 6 | 55.0 | 6.7 | 28.4 | 7.6 |
| | 12 | 73.2 | 18.8 | 54.3 | 20.6 |

The above data clearly show the improvement in weatherability and resistance to color change when the U.V. light absorber is concentrated at the surface of the composite material.

In addition to increased weatherability, the composite products of the present invention are cheaper to manufacture. Clear U.V. light absorbers are expensive but by concentrating the same at the surface in the capstock, the amount of U.V. stabilizer necessary to achieve the desired results is much less. Further, the composite products of the present invention in the form of films are excellent for use as greenhouse covers. Besides their good weatherability, they have low stretch, good tear resistance, and most importantly, they allow transmittance of some light in the region of 360 to 340 nanometers which in turn allows photosynthesis reactions in the growing plants. Numerous other advantages of the invention will be apparent to those skilled in the art.

It will be understood that the hereinabove description of the present invention is susceptible to various modifications, changes and adaptations, and the same are intended to be comprehended within the scope of the appended claims.

We claim:

1. A transparent or translucent polymeric composite material adapted for use outdoors comprising, a substrate containing a vinyl polymeric material selected from the group consisting of homopolymers of vinyl halides and vinylidene halides, copolymers of vinyl halides and vinylidene halides with each other and each with one or more polymerizable olefinic monomers having at least one terminal $CH_2=C<$ grouping, and chlorinated vinyl chloride homopolymers and copolymers, and mixtures of any of said homopolymers and copolymers, said substrate having integrally attached thereto a capstock containing a vinyl homopolymer or copolymer, from about 10 parts to less than about 35 parts by weight of a plasticizer, based on the weight of 100 parts of said homopolymer of copolymer, and from about 1 part to about 15 parts by weight of a clear U.V. light absorber, based on the weight of 100 parts of said homopolymer or copolymer, said U.V. light absorber being selected from the group consisting of substituted alkyl acrylates and alkoxy benzophenones.

2. A composite material as defined in claim 1 wherein said vinyl polymeric material is polyvinyl chloride having an inherent viscosity in the range of about 0.45 to about 1.20.

3. A composite material as defined in claim 1 wherein the vinyl homopolymer in the capstock is polyvinyl chloride having an inherent viscosity in the range of about 0.45 to about 1.20.

4. A composite material as defined in claim 2 wherein the vinyl homopolymer in the capstock is polyvinyl chloride having an inherent viscosity in the range of about 0.45 to about 1.20.

5. A composite material as defined in claim 1 wherein said plasticizer is dioctyl phthalate.

6. A composite material as defined in claim 1 wherein said plasticizer is a mixture of dioctyl phthalate and epoxidized soybean oil.

7. A composite material as defined in claim 1 wherein the U.V. light absorber is 1-cyano-2,2-diphenyl ethyl acrylate.

8. A composite material as defined in claim 1 wherein the U.V. light absorber is 1-cyano-2,2-diphenyl octyl acrylate.

9. A composite material as defined in claim 1 wherein the U.V. light absorber is 2-hydroxy-4-methoxy benzophenone.

10. A composite material as defined in claim 1 wherein the U.V. light absorber is 2-hydroxy-4n-octoxybenzophenone.

11. A composite material as defined in claim 4 wherein the plasticizer is a mixture of dioctyl phthalate and epoxidized soybean oil and the U.V. light absorber is 1-cyano-2,2-diphenyl ethyl acrylate.

12. A composite material as defined in claim 4 wherein the plasticizer is a mixture of dioctyl phthalate and epoxidized soybean oil and the U.V. light absorber is 1-cyano-2,2-diphenyl octyl acrylate.

13. A composite material as defined in claim 4 wherein the plasticizer is a mixture of dioctyl phthalate and epoxidized soybean oil and the U.V. light absorber is 2-hydroxy-4-methoxy benzophenone.

14. A composite material as defined in claim 4 wherein the plasticizer is a mixture of dioctyl phthalate and epoxidized soybean oil and the U.V. light absorber is 2-hydroxy-4n-octoxybenzophenone.

* * * * *